(12) United States Patent
Malik et al.

(10) Patent No.: US 6,865,094 B2
(45) Date of Patent: Mar. 8, 2005

(54) CIRCUIT FOR AC ADAPTER TO REDUCE POWER DRAWN FROM AN AC POWER SOURCE

(75) Inventors: Randhir S. Malik, Cary, NC (US); William Hemena, Raleigh, NC (US); Diep N. Ho, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 10/248,423

(22) Filed: Jan. 17, 2003

(65) Prior Publication Data

US 2003/0214822 A1 Nov. 20, 2003

Related U.S. Application Data

(63) Continuation-in-part of application No. 10/145,331, filed on May 14, 2002, now abandoned.

(51) Int. Cl.[7] .......................................... H02M 3/335
(52) U.S. Cl. ........................ 363/21.12; 363/21.15; 363/21.18
(58) Field of Search ....................... 363/21.12, 21.15, 363/21.18, 20, 21.01, 21.04, 21.07

(56) References Cited

U.S. PATENT DOCUMENTS

| | | | |
|---|---|---|---|
| 4,318,168 A | 3/1982 | Faxon | 363/56 |
| 4,400,767 A | 8/1983 | Fenter | 363/21 |
| 4,459,651 A | 7/1984 | Fenter | 363/21 |
| 4,499,531 A | 2/1985 | Bray | 363/19 |
| 4,791,546 A | 12/1988 | Carroll | 363/95 |
| 4,849,869 A | 7/1989 | Tanuma et al. | 363/21 |
| 5,055,991 A | 10/1991 | Carroll et al. | 363/56 |
| 5,184,290 A * | 2/1993 | Ozawa et al. | 363/21.07 |
| 5,282,122 A | 1/1994 | Summer | 363/21 |
| 5,301,095 A * | 4/1994 | Teramoto et al. | 363/21.07 |
| 5,313,381 A * | 5/1994 | Balakrishnan | 363/147 |
| 5,341,179 A * | 8/1994 | Konishi | 348/730 |
| 5,414,611 A | 5/1995 | Muto et al. | 363/21 |
| 5,475,579 A * | 12/1995 | John et al. | 363/21.07 |
| 5,513,088 A | 4/1996 | Williamson | 363/20 |
| 5,638,262 A | 6/1997 | Brown | 363/21 |
| 5,671,131 A | 9/1997 | Brown | 363/56 |
| 5,675,485 A | 10/1997 | Seong | 363/97 |
| 5,862,044 A * | 1/1999 | Shioya et al. | 363/21.07 |
| 5,925,278 A | 7/1999 | Hirst | 219/662 |
| 5,982,639 A | 11/1999 | Balakirshnan | 363/21 |
| 6,094,362 A | 7/2000 | Domingo | 363/21 |
| 6,125,046 A | 9/2000 | Jang et al. | 363/49 |
| 6,362,980 B1 * | 3/2002 | Ohashi et al. | 363/21.01 |

* cited by examiner

Primary Examiner—Bao Q. Vu
(74) Attorney, Agent, or Firm—Carlos Munoz-Bustamante; Sawyer Law Group, LLP

(57) ABSTRACT

An AC adapter which reduces the amount of power drawn from an AC power source when a system is disconnected from the adapter, includes: a rectifier bridge for rectifying an AC voltage from an AC power supply; a conversion circuit coupled to the rectifier bridge for converting the rectified AC voltage to a DC voltage; and an opto-coupler coupled to the conversion circuit for monitoring an output connection of the circuit, wherein when a system is not coupled to the output connection, the opto-coupler substantially prevents the AC voltage from being drawn from the AC power supply. The adapter circuit uses an opto-coupler comprising a diode and a transistor to reduce the amount of current drawn from an AC power supply when a system is not connected to the AC adapter. In this manner, the AC adapter is prevented from becoming heated when no system is connected.

10 Claims, 2 Drawing Sheets

CIRCUIT FOR AC ADAPTER TO REDUCE POWER DRAWN FROM AN AC POWER SOURCE

FIELD AND BACKGROUND OF THE INVENTION

The present invention relates to power supplies, and more particularly to the AC power adapters for power supplies.

Alternating current (AC) power adapters are well known in the art. FIG. 1 illustrates a conventional circuit for an AC power adapter. The adapter circuit 100 comprises an electro-magnetic compatibility (EMC) filter 102 which can be coupled to an AC power source 104. The EMC filter 102 allows the adapter circuit 100 to meet the EMC requirement. The EMC requirement is well known in the art and will not be further described here. The EMC filter 102 is coupled to the input nodes of a rectifier bridge 106, as illustrated, for rectifying the AC voltage from the AC power source 104. Coupled to the rectifier bridge 106 is a conversion circuit 108 for converting the rectified AC voltage from the rectifier bridge 106 to a direct current (DC) voltage for the system 110.

However, when the system 110 is disconnected, or the "start" key on the keyboard is in the "stop" state, the circuit 100 continues to draw power from the power supply 104. The adapter circuit 100 draws a standby power whether the system 110 is connected to the adapter or not. Typically, the switching losses while the AC adapter is in idle mode reach as high as 5W and causes the plastic housing of the adapter (not shown) to heat, resulting in wasted power.

Accordingly, there exists a need for a circuit for an AC adapter which reduces the amount of power drawn from an AC power source when a system is disconnected from the adapter. The present invention addresses such a need.

BRIEF SUMMARY OF THE INVENTION

An AC adapter which reduces the amount of power drawn from an AC power source when a system is disconnected from the adapter, includes: a rectifier bridge for rectifying an AC voltage from an AC power supply; a conversion circuit coupled to the rectifier bridge for converting the rectified AC voltage to a DC output voltage; and an opto-coupler coupled to the conversion circuit for monitoring an output connection of the circuit, wherein when a system is not coupled to the output connection, the opto-coupler substantially prevents the AC voltage from being drawn from the AC power supply. The adapter circuit uses an opto-coupler comprising a diode and a transistor to reduce the amount of current drawn from an AC power source when a system is not connected to the AC adapter. In this manner, the AC adapter is prevented from becoming heated when no system is connected. This invention meets the 1W

DETAILED DESCRIPTION OF THE INVENTION

The present invention provides a circuit for an alternating current (AC) to direct current (DC) adapter which reduces the amount of power drawn from an AC power source when a system is disconnected from the adapter. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The adapter circuit in accordance with the present invention uses an opto-coupler comprising a diode and a transistor to reduce the amount of current drawn from an AC power source when a system is not connected to the AC adapter. When a system is connected, the diode of the opto-coupler is shorted by a switch and the transistor of the opto-coupler is turned off, which allows the AC adapter to provide power to the system. When a system is not connected, current flows through the diode of the opto-coupler and the transistor of the opto-coupler is turned on, which prevents power from being drawn from the AC power source.

To more particularly describe the features of the present invention, please refer to FIG. 2 in conjunction with the discussion below.

Figure 1:
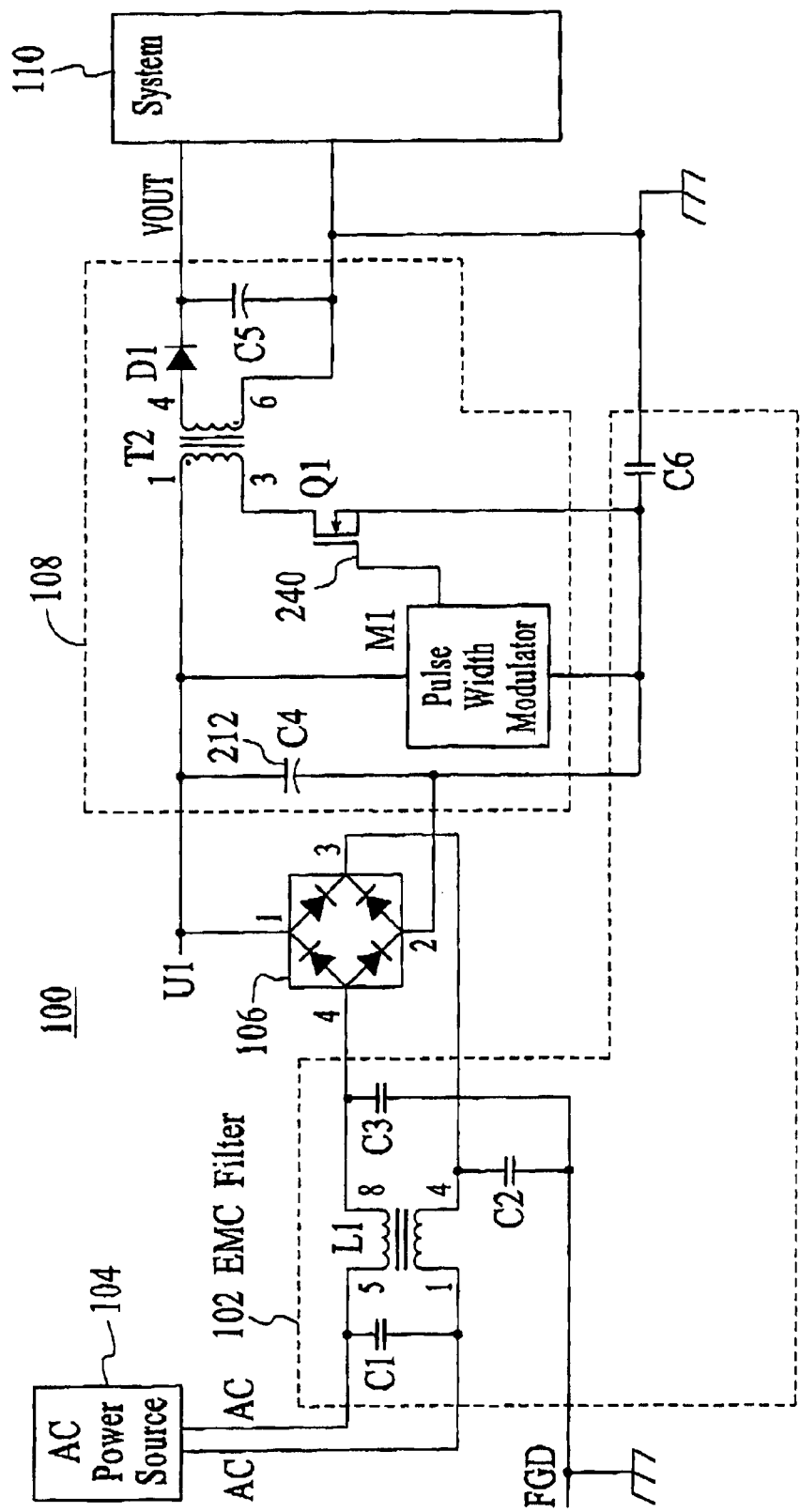
FIG. 1 illustrates a conventional circuit for an AC power adapter.
Figure 2:
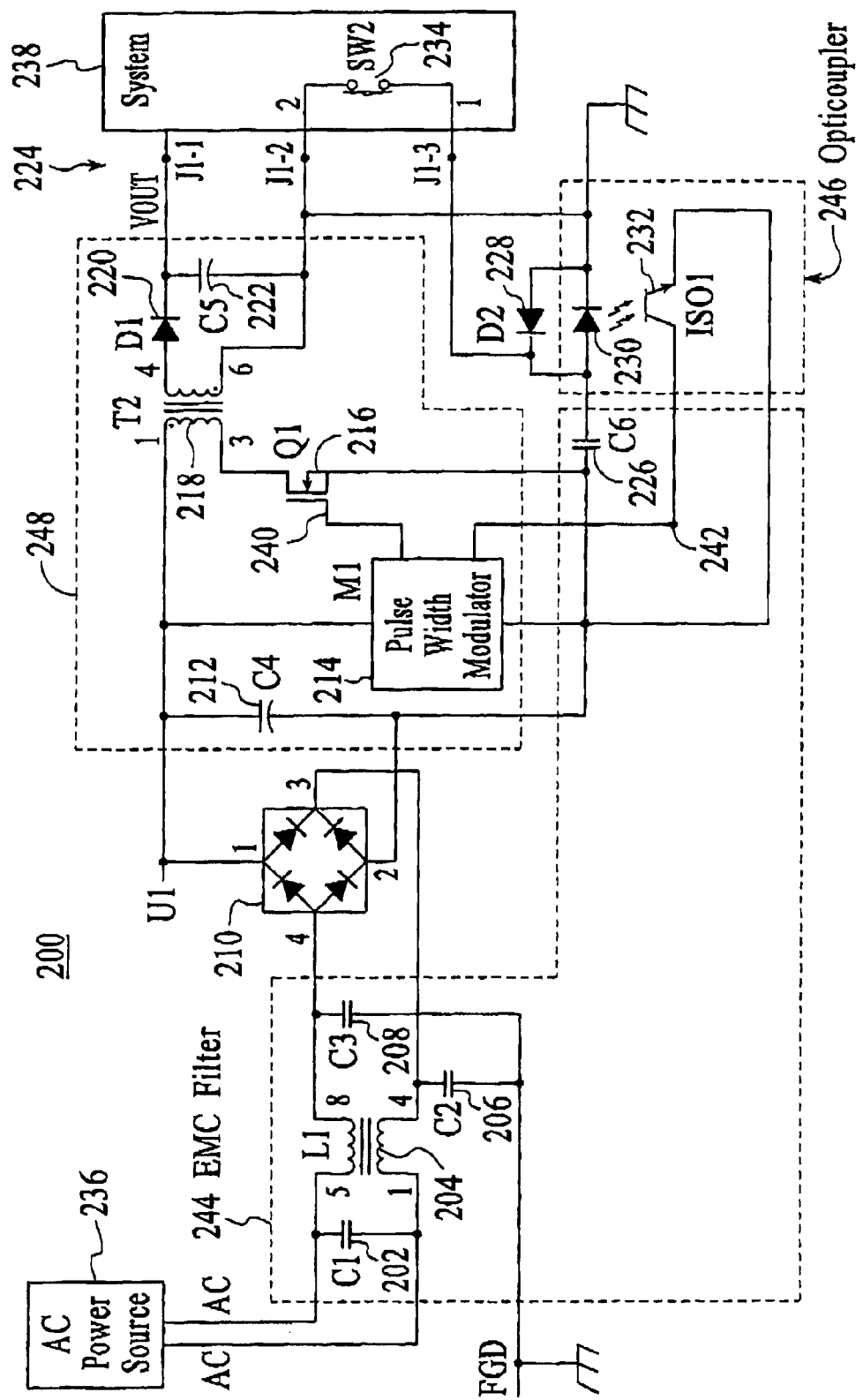
FIG. 2 illustrates a preferred embodiment of a circuit for an AC adapter which reduces the amount of power drawn from an AC power source when a system is disconnected from the adapter, in accordance with the present invention.

FIG. 2 illustrates a preferred embodiment of a circuit for an AC adapter which reduces the amount of power drawn from an AC power source when a system is disconnected from the adapter, in accordance with the present invention. The adapter circuit 200 comprises an electro-magnetic compatibility (EMC) filter 244 which can be coupled to an AC power source 236. The EMC filter 244 comprises a capacitor (C1) 202, an inductor (L1) 204, and a capacitor (C2) 206, a capacitor (C3) 208, and a capacitor (C6) 226. The EMC filter 244 allows the adapter circuit 200 to meet the EMC requirement. The EMC requirement is well known in the art and will not be further described here. The EMC filter 244 is coupled to the input nodes of a rectifier bridge 210, as illustrated, for rectifying the AC voltage from the AC power source 236.

Coupled to the output nodes of the rectifier bridge 210 is a conversion circuit 248 for converting the rectified AC voltage from the rectifier bridge 210 to a direct current (DC) voltage for the system 238. In the preferred embodiment, the conversion circuit 248 comprises an electrolyte capacitor (C4) 212 which develops a DC voltage from the output of the rectifier bridge 210, a pulse width modulator (PWM) 214, a switching transistor (Q1) 216, a flyback transformer (T2) 218, a diode (D1) 220, and a filter capacitor (C5) 222. The PWM 214 is coupled in parallel with C4 212 and also coupled to the gate 240 of Q1 216. The primary winding of T2 218 is coupled to an output node of the rectifier bridge 210 and to the drain of Q1 216. In the preferred embodiment, Q1 216 comprises a metal oxide semiconductor field effect transistor (MOSFET). The secondary winding of T2 218 is coupled in parallel with C5 222. D1 220 is coupled in series between the secondary winding of T2 218 and C5 222.

The adapter circuit 200 further comprises a diode (D2) 228 and an opto-coupler 246. The opto-coupler 246 comprises a diode 230 and a transistor 232. The opto-coupler 246 monitors an output connection (J1) 224 of the adapter circuit 200 to determine whether or not the system 238 is connected to the adapter circuit 200. In the preferred embodiment, J1 224 comprises three pins, J1-1, J1-2, and J1-3. The diode 228 and the ISO1 246 also provide a path for the AC current flowing through C6 226.

A switch (SW2) 234 represents a break in the connection of the system 238 to the frame ground (FGD), either through the start/stop key on a keyboard (not shown) or through a pin on J1 224. When SW2 234 is closed, i.e., the system 238 is connected to the adapter circuit 200, or the start/stop key on the keyboard is in the "start" position, the diode 230 of the opto-coupler 246 is shorted and the transistor 232 of the opto-coupler 246 is turned off. Turning off the transistor 232 turns on the PWM 214, causing the gate 240 of Q1 216 to turn Q1 216 on or off. The PWM 214 and the switching by Q1 216 provides a high frequency waveform from the DC voltage from C4 212. The high frequency waveform is forwarded to D1 220 by T2 218. T2 218 isolates the primary side of the adapter circuit 200 from the secondary side. D1 220 rectifies the high frequency waveform. C5 222 filters this waveform and provides it as an output DC voltage to the system 238.

When SW2 234 is open, i.e., the system 238 is not connected to the adapter circuit 200, the short across the diode 230 of the opto-coupler 246 is removed and the transistor 232 is turned on. Turning on the transistor 232 will turn off the PWM 214 by pulling node 242 to ground. When the PWM 214 is off, the gate 240 of Q1 216 is also shorted to ground. The short prevents Q1 216 from switching, which prevents the functioning of the conversion circuit 248. The adapter circuit 200 thus substantially reduces the power drawn from the AC power source 236. The current drawn from the AC source 236 is limited to the start up current, which is generally less than 0.1 mA. This corresponds to a power dissipation of less than 35 mW. Without the opto-coupler 246 monitoring the connection of the system 238 to the adapter circuit 200, Q1 216 would continue to switch even when the switch 234 is open, approximately 5 w. Power would continue to be drawn from the AC power source 236 in idle mode.

An AC adapter which reduces the amount of power drawn from an AC power source when a system is disconnected from the adapter has been disclosed. The adapter circuit uses an opto-coupler comprising a diode and a transistor to reduce amount of current drawn from an AC power supply when a system is not connected to the AC adapter. When a system is connected, the diode of the opto-coupler is shorted and the transistor of the opto-coupler is turned off, which allows the AC adapter to provide power to the system. When a system is not connected, current flows through the diode of the opto-coupler and the transistor of the opto-coupler is turned on, which prevents power from being drawn from the AC power source. In this manner, the AC adapter is prevented from becoming heated when no system is connected. This invention meets the "1W initiative", an industry goal of utilizing AC adapters which waste less than 1W of power when not connected to the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A circuit, comprising:
   a rectifier bridge for rectifying an AC voltage from an AC power supply;
   a conversion circuit coupled to the rectifier bridge for converting the rectified AC voltage to a DC voltage, the conversion circuit comprising:
      a transformer comprising a primary winding and a secondary winding,
      a pulse width modulator (PWM) coupled to the primary winding, and
      a switching transistor, wherein a gate of the switching transistor is coupled to the PWM and a drain of the switching transistor is coupled to the primary winding;
   an opto-coupler coupled to the conversion circuit for monitoring an output connection coupled to the secondary winding, wherein the opto-coupler comprises:
      a diode, wherein an anode of the diode is coupled to the PWM and the switching transistor, and a cathode of the diode is coupled to the secondary winding, and
      a transistor coupled to the diode and the PWM,
      wherein when a system is not coupled to the output connection, an AC ground current flows through the diode, wherein the transistor is turned on, wherein the PWM and the switching transistor are turned off, such that the AC voltage is substantially prevented from being drawn from the AC power supply.

2. The circuit of claim 1, wherein when the system is coupled to the output connection, the diode of the opto-coupler is shorted and the transistor of the opto-coupler is turned off, wherein when the transistor of the opto-coupler is turned off, the conversion circuit draws the AC voltage from the AC power supply.

3. The circuit of claim 1, wherein the conversion circuit comprises:
   an electrolyte capacitor coupled to the rectifier bridge;
   the PWM coupled in parallel to the electrolyte capacitor;
   the transformer comprising the primary winding and the secondary winding;
   the switching transistor, wherein the gate of the switching transistor is coupled to the PWM and the drain of the switching transistor is coupled to the transformer;
   a first diode coupled in series to the secondary winding of the transformer; and
   a filter capacitor coupled in series to the first diode, coupled in parallel to the secondary winding of the transformer, and coupled to the output connection.

4. The circuit of claim 3, wherein the electrolyte capacitor provides a DC voltage from the rectified AC voltage.

5. The circuit of claim 3, wherein the PWM and the switching transistor provides a high frequency waveform from a DC voltage from the electrolyte capacitor.

6. The circuit of claim 3, wherein the first diode rectifies a high frequency waveform provided by the PWM and the switching transistor.

7. The circuit of claim 3, wherein the filter capacitor filters the rectified high frequency waveform.

8. The circuit of claim 1, further comprising:
   a second diode coupled in parallel to the diode of the opto-coupler.

9. The circuit of claim 1, further comprising:
   an EMC filter coupled in series to the AC power source and the rectifier bridge.

10. A circuit comprising:
    a rectifier bridge for rectifying an AC voltage from an AC power supply;
    a conversion circuit coupled to the rectifier bridge for converting the rectified AC voltage to a DC voltage, wherein the conversion circuit comprises:
       an electrolyte capacitor coupled to the rectifier bridge,
       a PWM coupled in parallel to the electrolyte capacitor,
       a transformer comprising a primary winding and a secondary winding, wherein the PWM is coupled to the primary winding
       a switching transistor, wherein a gate of the switching transistor is coupled to the PWM and a drain of the switching transistor is coupled to the primary winding of the transformer, a first diode coupled in series to the secondary winding of the transformer, and a filter capacitor coupled in series to the first diode, coupled in parallel to the secondary winding of the transformer, and coupled to an output connection of the circuit; and an opto-coupler coupled to the conversion circuit for monitoring the output connection, wherein the opto-coupler comprises:

a second diode, wherein an anode of the second diode is coupled to the PWM and the switching capacitor, and a cathode of the second diode is coupled to the secondary winding, and a transistor coupled to the second diode and the PWM, wherein when a system is not coupled to the output connection, an AC ground current flows through the second diode, wherein the transistor is turned on, wherein the PWM and the switching transistor are turned off, such that AC voltage is substantially prevented from being drawn from the AC power supply.

* * * * *

UNITED STATES PATENT AND TRADEMARK OFFICE
CERTIFICATE OF CORRECTION

| | | |
|---|---|---|
| PATENT NO. | : 6,865,094 B2 | Page 1 of 1 |
| APPLICATION NO. | : 10/248423 | |
| DATED | : March 8, 2005 | |
| INVENTOR(S) | : Malik et al. | |

It is certified that error appears in the above-identified patent and that said Letters Patent is hereby corrected as shown below:

In column 1, line 53, add --initiative.-- after "1W".

Signed and Sealed this

Twenty-ninth Day of August, 2006

JON W. DUDAS
*Director of the United States Patent and Trademark Office*